D. P. SOLOMON.
TROLLEY FINDER.
APPLICATION FILED NOV. 24, 1911.
1,161,421.
Patented Nov. 23, 1915.
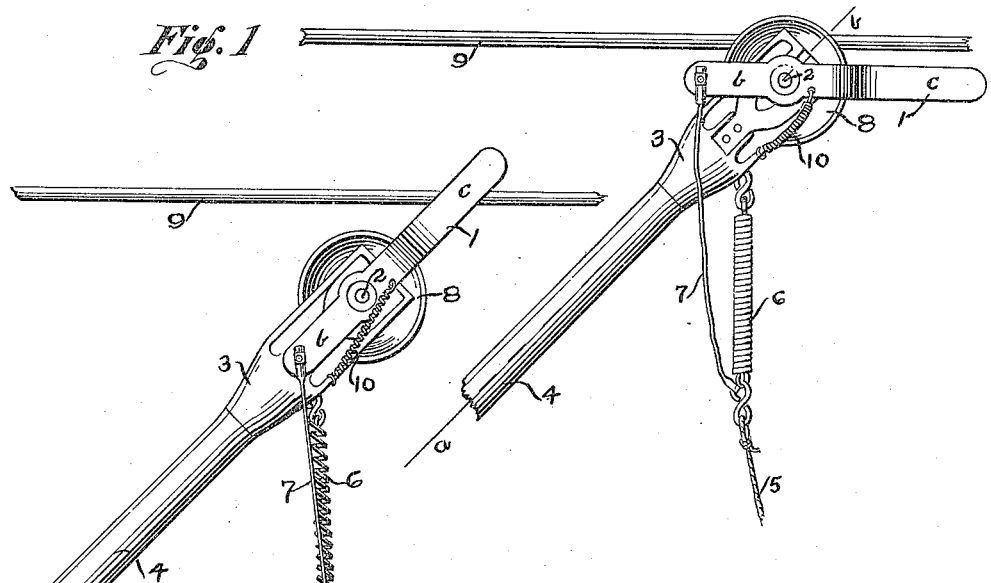
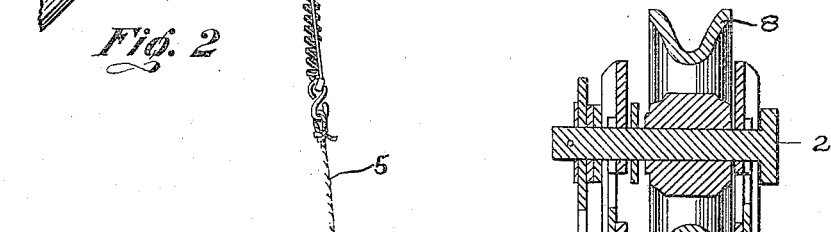
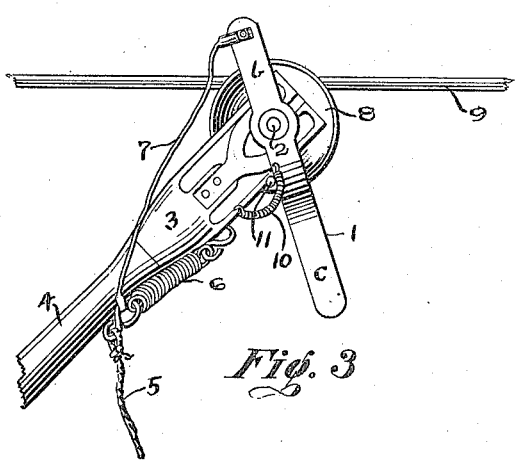
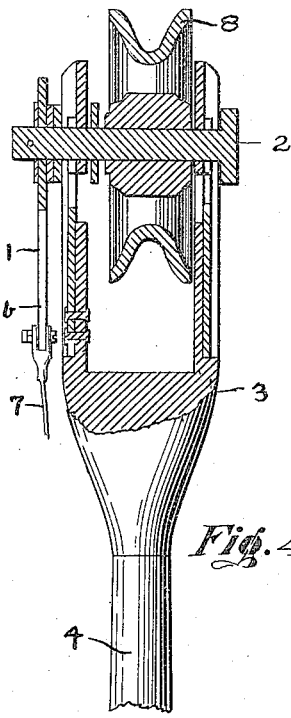
WITNESSES
H. Montague Hall
H. S. Kozminsky
INVENTOR
D. P. SOLOMON
per A. S. Paré
ATTORNEY

UNITED STATES PATENT OFFICE.

DAVID P. SOLOMON, OF BERKELEY, CALIFORNIA.

TROLLEY-FINDER.

1,161,421. Specification of Letters Patent. Patented Nov. 23, 1915.

Application filed November 24, 1911. Serial No. 662,224.

*To all whom it may concern:*

Be it known that I, DAVID P. SOLOMON, residing in the city of Berkeley, county of Alameda, State of California, have invented certain new and useful improvements in Trolley-Finders, whereof the following is a specification.

My invention relates to the electric railway art, and especially to devices used in said art which include trolley wheels sustained on upward springing, swiveled, trolley poles; and it has for its object to provide new and improved means for guiding the pole to the precise position for causing engagement between the trolley wire and the wheel.

My invention consists in an arm pivoted on one side of the trolley head which may be extended above said head for a suitable distance in such a position that when the arm makes contact with the wire, the trolley wheel is directly under said wire, and when the pole is thereafter allowed to swing upwardly, engagement between the wheel and wire takes place with certainty.

It also consists in means attached to said arm for pulling the same into an out-of-the-way position when said arm is not in operation; and means for pulling said arm into operative position when desired.

It also consists in the novel combinations, arrangements, and parts, set forth in the following description, particularly pointed out in the claims, and illustrated in the accompanying drawing, of which.

Figure 1, is a view in elevation of my trolley finder, in its non-operative position, showing its relation to the trolley wire, wheel, head, and pole; Fig. 2 is a view in elevation of my trolley finder in its operative position, showing its contact with a trolley wire; Fig. 3, is a similar view, showing my trolley finder at the instant after contact has been made between the wheel and the wire, and Fig. 4, is a view partly in section, taken along the line *a, b,* Fig. 1, showing the forward portion of the arm broken away.

The same symbol of reference marks the same part in whichever view it may appear.

Describing my device in detail, 1 is an arm pivoted at 2 on the trolley head 3 of the pole 4. Referring to Fig. 2, the pole rope 5, which is used for turning the pole on its swivel, and lowering it against its upward springing tendency, is connected with a very strong spring 6, which is extended by pulling on the rope 5, and which is attached to the trolley head 3. The pivoted arm 1 forms a lever, one member *b* of which extends on one side of the pivot, and a second arm *c* on the other side thereof. To the arm *b* is attached a cord or wire 7, the other extremity of which joins the rope 5 at or near its junction with the spring 6. When the rope is pulled, the wire 7 pulls the arm into the position shown in Fig. 2, in which the member *c* extends beyond the wheel 8.

The arrangement of these parts is such that when arm 1 bears against the wire 9, the trolley wheel 8 is directly underneath the wire (see Fig. 2.) Upon, now, relieving the pull on the rope the pole springs upward, bringing the wheel against the wire; a further upward movement of the rope, under the action of spring 6, releases the arm 1 which is then drawn down by spring 10 into non-operative position, as shown in Fig. 1. Should the arm vibrate beyond the position shown in Fig. 1, it is stopped by the stop 11, in the position shown in Fig. 3, whence it returns to the position of Fig. 1 by the weight of the rope and connected parts.

In operating my device, the pole is pulled downwardly a suitable distance so the wheel may pass under the wire, but close enough thereto to allow the arm 1 to engage. The pole is then drawn about its swivel by the rope 5 until the arm 1 makes contact with the wire; whereupon the pull on the rope is released and the wheel goes into engagement.

Having described my invention what I claim as new and desire to secure by Letters Patent of the United States, modifications within the scope of the claims being expressly reserved is:—

1. In combination with a trolley wire, a finder comprising an upward extending pivoted pole, a head on said pole having a wheel adapted to engage said trolley wire, a lateral guide arm pivoted on the side of said head for directing said wheel to said trolley wire; a rope connected at one end of said arm for drawing its opposite end into operative position; a coil spring, one end of which is secured to said head and the other end to said rope for releasing said rope after each operation, a second coil spring secured at one end to said arm and the opposite end to said head for returning said arm to its non-operative position and means for limiting the movements of said arm.

2. A trolley finder comprising an upward extending pole, a head on said pole, having a trolley wheel, a lateral guide arm pivoted on said head, a rope connected to said arm for drawing said arm in operative position, a coil spring secured to said head and said rope for releasing the tension of said rope; a second coil spring, one end of which is secured to said guide and the opposite end to said head for returning said arm to its non-operative position and means for limiting the upward movement of said arm.

In testimony that I claim the foregoing I have hereto set my hand in the presence of witnesses, this 25th day of September, 1911.

DAVID P. SOLOMON.

Witnesses:
JOHN J. AYLWARD,
BLANCHE C. CHESTER.

Copies of this patent may be obtained for five cents each, by addressing the "Commissioner of Patents, Washington, D. C."